(12) United States Patent
Rice (10) Patent No.: US 9,710,508 B2
(45) Date of Patent: Jul. 18, 2017

(54) METHOD AND SYSTEM FOR MANAGING DATA IN A WORKFLOW PROCESS

(75) Inventor: Joseph H. Rice, Acton, MA (US)

(73) Assignee: QuickBase, Inc., Cambridge, MA (US)

( * ) Notice: Subject to any disclaimer, the term of this patent is extended or adjusted under 35 U.S.C. 154(b) by 1079 days.

(21) Appl. No.: 11/372,973

(22) Filed: Mar. 9, 2006

(65) Prior Publication Data

US 2007/0214162 A1    Sep. 13, 2007

(51) Int. Cl.
*G06F 3/048*     (2013.01)
*G06F 17/30*    (2006.01)

(52) U.S. Cl.
CPC .............................. *G06F 17/30348* (2013.01)

(58) Field of Classification Search
CPC ....... G06F 3/0481; G06F 3/016; G06F 9/4448
USPC ...................... 715/700–867; 707/8
See application file for complete search history.

(56) References Cited

U.S. PATENT DOCUMENTS

| | | | |
|---|---|---|---|
| 5,339,389 A | | 8/1994 | Bates et al. |
| 6,006,239 A | | 12/1999 | Bhansali et al. |
| 6,073,161 A | | 6/2000 | DeBoskey et al. |
| 6,240,414 B1 | * | 5/2001 | Beizer et al. ..................... 707/8 |
| 7,058,663 B2 | * | 6/2006 | Johnston et al. ............. 707/200 |
| 7,096,223 B2 | | 8/2006 | Cope |
| 7,165,248 B2 | * | 1/2007 | Holtz et al. ................... 717/170 |
| 2002/0116403 A1 | | 8/2002 | Weedon |
| 2004/0024795 A1 | | 2/2004 | Hind et al. |
| 2004/0187090 A1 | * | 9/2004 | Meacham ..................... 717/103 |
| 2005/0102314 A1 | | 5/2005 | Howard et al. |

FOREIGN PATENT DOCUMENTS

| | | |
|---|---|---|
| EP | 0 319 232 A2 | 6/1989 |
| EP | 1582983 | 10/2005 |
| GB | 2390445 | 1/2004 |
| WO | 03050726 | 6/2003 |

OTHER PUBLICATIONS

GB Search Report, Application No. GB0704572.7, Jun. 18, 2007, pp. 1-2.
German Office Action dated Jan. 10, 2008.
English Translation of German Office Action dated Jan. 10, 2008.
European Search Report for European Application No. EP 05102381.0, dated Jul. 27, 2005, 2 pages.

* cited by examiner

*Primary Examiner* — Rashawn Tillery (57) ABSTRACT

In general, in one aspect the invention relates to a method and system for managing data. The method and system involves identifying for a first user at least one record of a plurality of records, generating a user interface which displays a data field associated with the at least one record in a grid format, receiving from a second user, subsequent to generating the first user interface, a first desired modification of the data field, receiving from the first user a second desired modification of the data field, triggering a conflict resolution process, wherein the conflict resolution process involves choosing a chosen modification from the first desired modification and the second desired modification, and saving the chosen modification in the data field.

26 Claims, 4 Drawing Sheets

METHOD AND SYSTEM FOR MANAGING DATA IN A WORKFLOW PROCESS

BACKGROUND

Various methods for changing data in a workflow process exist in modern computing. For example, a purchasing agent working for a company may receive requests from employees needing various items. That purchasing agent then determines the proper vendors from which to solicit bids, gets approvals for purchases, negotiates delivery dates, and eventually places orders, receives the orders, and delivers the purchases. Following the placement of the orders, various computer records are updated reflecting the details of the orders, and the employees are optionally notified that the order is placed.

Records used in workflow processes are stored in many forms. For example, records may be stored in spreadsheets, databases, linked lists, or other proprietary data structures meeting the needs of system designers. Similar to the example discussed above, workflow processes typically involve records generated by one or more persons at one location within a company, with one or more of those records being edited by or updated by one or more persons at a second location within a company. In some cases, sets of commonly accessible records may be opened by two users or more, with one or more edits being made by each of those users. To keep these records accurate, data integrity checks and conflict resolution between the edits of the various users are performed.

SUMMARY

In general, in one aspect, the invention relates to a method for managing data. The method comprises identifying for a first user at least one record of a plurality of records, generating a user interface which displays a data field associated with the at least one record in a grid format, receiving from a second user, subsequent to generating the user interface, a first desired modification of the data field, receiving from the first user a second desired modification of the data field, triggering a conflict resolution process, wherein the conflict resolution process comprises choosing a chosen modification from the first desired modification and the second desired modification, and saving the chosen modification in the data field.

In general, in one aspect, the invention relates to a workflow process system. The system comprises a graphical user interface configured to display a data field associated with at least one record in a grid format, wherein the at least one record is identified for a first user from a plurality of records, a processor, and a storage device configured to store the chosen modification in the data field. The processor is configured to execute instructions to: receive from a second user, subsequent to display of the data field, a first desired modification of the data field, receive from the first user a second desired modification of the data field, and trigger a conflict resolution process, wherein the conflict resolution process comprises choosing a chosen modification from the first desired modification and the second desired modification.

In general, in one aspect, the invention relates to a machine readable medium. The machine readable medium comprising executable instructions stored thereon for: identifying for a first user at least one record of a plurality of records, generating a user interface which displays a data field associated with the at least one record in a grid format, receiving from a second user, subsequent to generating the user interface, a first desired modification of the data field, receiving from the first user a second desired modification of the data field, triggering a conflict resolution process, wherein the conflict resolution process comprises choosing a chosen modification from the first desired modification and the second desired modification, and saving the chosen modification in the data field.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid overcomplicating this disclosure.

In this specification, it is intended that the term "coupled" describe devices which interact with each other, directly or indirectly. For example, first and second devices that interact with each other through a transmission line between the two devices are directly coupled. Further, first and second devices that have intermediate devices disposed between them, and interact with one another through those intermediate devices, are indirectly coupled. In both situations, the first and second devices are considered coupled.

In general, embodiments of the invention relate to a method and apparatus for managing records in a workflow process. More particularly, a method and apparatus for managing records in workflow process includes identifying a subset of records to be presented to a first user using a first processing station, and displaying the subset of records in a grid format of rows and columns. At some time before, during, or after the modification of the data field but prior to saving the modification made by the first user, the same data field is modified in a different way by a second user on a second processing station. A data integrity test is performed prior to a saving process on one or more of the proposed modifications in order to ensure that the one or more proposed modifications conform to any data integrity requirements that may be associated with the data field. A conflict resolution process is also performed prior to a saving process in order to determine which of the two modifications is chosen by the second user. The modification chosen is then saved.

Figure 1:
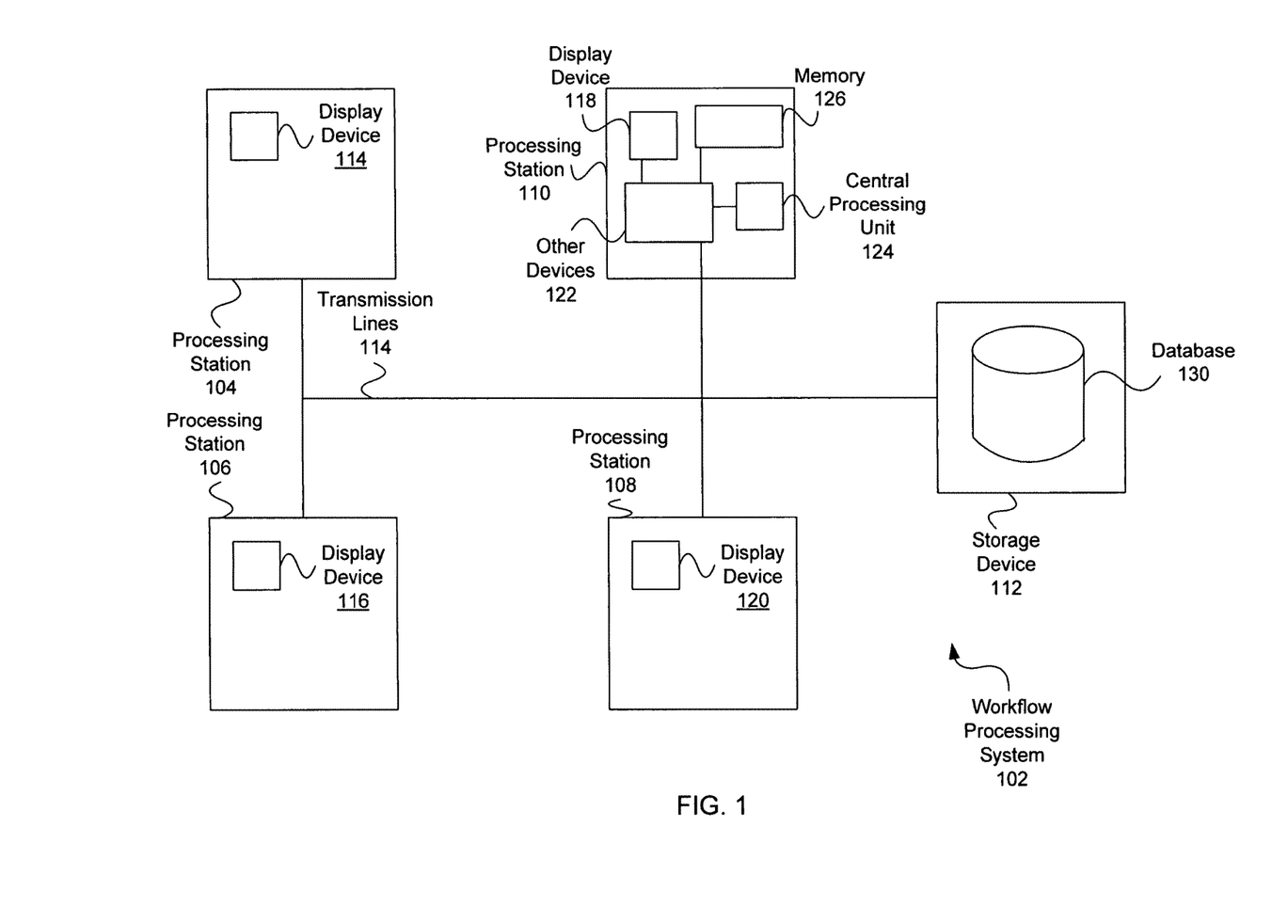
FIG. 1 shows a block diagram of a workflow processing system according to one or more embodiments of the invention.

FIG. 1 shows a block diagram of a workflow processing system 102 according to the invention. The workflow processing system 102 includes processing stations 104, 106, 108, and 110 for operating on records within a workflow process. Storage device 112 is provided primarily as a records storage device, and therefore may include database 130 (or other records storage functionality), but may alternatively also include functionality similar to one or more of processing stations 104, 106, 108, and 110, if desired. Further, although storage device 112 is shown as a single device, records within the workflow processing system 102 may be distributed across multiple storage devices (not shown) within workflow processing system 102.

Processing stations 104, 106, 108, and 110 and storage device 112 are coupled to and communicate with each other over transmission lines 114. Persons of ordinary skill in the art having the benefit of this disclosure will readily be aware that there may be intermediate devices disposed between any two or more of the processing stations 104, 106, 108, and 110 and storage device 112. Those skilled persons will also be aware that the intermediate devices may perform data transmission tasks, which are not the subject of this disclosure. The intermediate devices are therefore not shown or described herein in order to minimize the complexity of this disclosure.

In one or more embodiments of the invention, one or more operations within the workflow processing system 102 are performed using one or more computer systems coupled to a network, such as the Internet, a local area network, a wide area network, a combination of different networks, or other computer communication methods enabling electronic communication of data. Such a network may be used, among other things, to facilitate communication between one or more processing stations 104, 106, 108, and 110 and storage device 112 involved with the editing, review, movement and storage of data within workflow processing system 102.

Processing stations 104, 106, 108, and 110 each include respective display devices 114, 116, 118, 120 on which information may be displayed to facilitate accomplishing workflow processing tasks. A processing station may vary as to functional capabilities and computing power. In one or more embodiments of the invention, a processing station, such as processing station 104, is a thin client having minimal local capabilities in functional areas, such as memory, data storage and processing power. In one or more embodiments of the invention, a processing station, such as processing station 108, is equipped with central processing unit (CPU) 124, memory 126, and other devices 122, such as those found in a traditional computing environment. Persons of ordinary skill in the art having the benefit of this disclosure will readily understand how to adapt the workflow processing system 102 to a variety of configurations of processing stations, such as processing stations 104, 106, 108, and 110, while remaining within the scope and purpose of the invention.

Storage device 112 may be independent of other processing stations in the system, such as processing stations 104, 106, 108, and 110, or may instead be integrated with one or more portions of a processing station, and therefore provide at least a portion of the functionality generally provided by a processing station with respect to editing, moving, displaying, etc., data within workflow processing system 102.

As previously discussed, although storage device 112 is depicted here as a single device, the data being processed within workflow processing system 102 may be distributed across multiple devices that are each coupled to one or more processing stations, such as processing station 110. To simplify this disclosure, although the data within storage device 112 may be stored using any desired format and operated on using any desired methodology, examples are provided where the data within storage device 112 is stored in a data repository, such as database 130, provided for that purpose.

Portions of the functionality necessary to perform the invention may be included in one or more processing stations, such as processing stations 104, 106, 108, and 110, or may instead be provided by a different device (not shown) coupled to workflow processing system 102, or may be integrated into storage device 112 (such as within database 130 or within software running on storage device 112).

As previously discussed, embodiments of the invention relate to a method and apparatus for managing one or more records in a workflow process. One or more records are received through at least one normal business process, such as a sales desk, customer service inquiry, etc. Following receipt of a record, characteristics associated with the origination point of a record, the originator of the record, or of the record itself causes that record to be provided to one or more users of the workflow processing system 102. Records provided to multiple users for editing (or for other reasons) may be modified by those users in conflicting ways. Providing a data integrity process and a conflict resolution process ensures that a master set of records, such as might be present within database 130, conforms to pre-established data integrity rules with the chosen modification being saved to the database 130.

By way of example, a first subset of records from a master set of records presented to a first user may be displayed on a processing station, such as processing station 106. A second subset of records overlapping the first subset (e.g., the second subset of records includes at least one record also included in the first subset of records) is presented to a second user, with both users editing the same field within at least one record common to both subsets of records.

Figure 2:
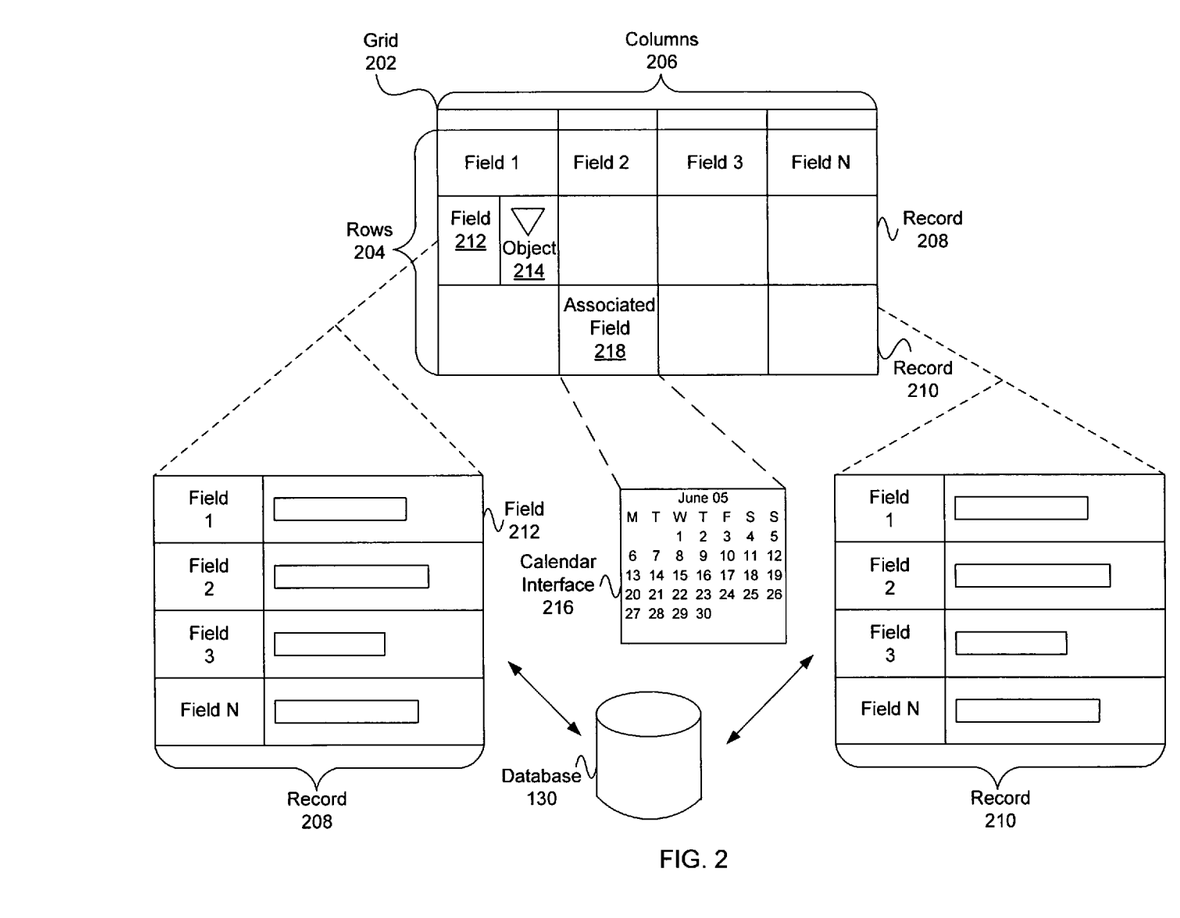
FIG. 2 shows a grid layout according to one or more embodiments of the invention.

FIG. 2 shows a grid layout according to one or more embodiments of the invention. In one or more embodiments of the invention, grid 202 includes records displayed as rows 204 and fields within those records displayed as columns 206. In one or more embodiments of the invention, grid 202 includes records displayed as columns (not shown) and fields within those records displayed as rows (not shown). Further, records are presented to users of processing stations, such as processing stations 104, 106, 108, and 110 in FIG. 1, as fully-editable records. In order to resolve conflicts resulting from two or more users requesting modifications to the same record field while both have the record open for editing, a conflict resolution process is performed, to determine which modification should be chosen.

In one or more embodiments of the invention, conflicts between two users are resolved by: (1) informing the users that a conflict exists (e.g., a first user is attempting to change a priority attribute of the data from P3 to P1 and a second user is attempting to change a priority attribute of the data from P3 to P2); (2) highlighting the particular data cell in question; and (3) asking the second user to choose which of the conflicting changes (i.e., the attempted change by the first user and the attempted change by the second user) to accept. One skilled in the art will appreciate that if more than one conflict exists, the process repeats for each cell with a conflict (with the user choosing which of the conflicting changes to accept over and over again). Further, one skilled in the art will appreciate that if a third user creates additional conflicts while the second user is performing conflict resolution, the second user is presented with a new set of conflicts (the conflict between the accepted change and the change attempted by the third user) when attempting to save the earlier accepted changes.

Grid 202 is a form of graphical user interface and includes display attributes that facilitate the adding, modification and saving of records, and record changes to database 130 in FIG. 1. In one or more embodiments of the invention, grid 202 includes multiple records (e.g., record 208 and 210). Each record 208 and 210 may have many fields, a subset of which is displayed for any given user, depending on configurable settings.

As an example, record 208 includes one or more fields, such as field 212, which optionally includes an embedded object, such as object 214. Such an object 208 includes a visual representation for the user at appropriate times, but also includes functionality appropriate for that object.

In one or more embodiments of the invention, object 214 includes a calendar interface 216 with appropriate functionality to receive user input such as the selection of a date, the selection of a different month from which one or more dates may be selected, etc. In one or more embodiments of the invention, calendar interface 216 is optionally triggered by a user attempting to enter data into the associated field 218, receiving user input such as the selection of a date, the selection of a different month from which one or more dates may be selected, etc.

In one or more embodiments of the invention, object 214 is a menu with user selectable menu items, which are valid choices for the particular associated field. In one or more embodiments of the invention, a drop down menu object is dynamically populated with items previously used in the same field for this or other records, and is optionally configured to receive text input (via a data entry field) to update the available menu item choices.

In one or more embodiments of the invention, calendar interface 216 is optionally triggered by a user attempting to enter data into the associated field 218, with appropriate functionality to receive user input, such as the selection of a date, the selection of a different month from which one or more dates may be selected, etc.

Figure 3:
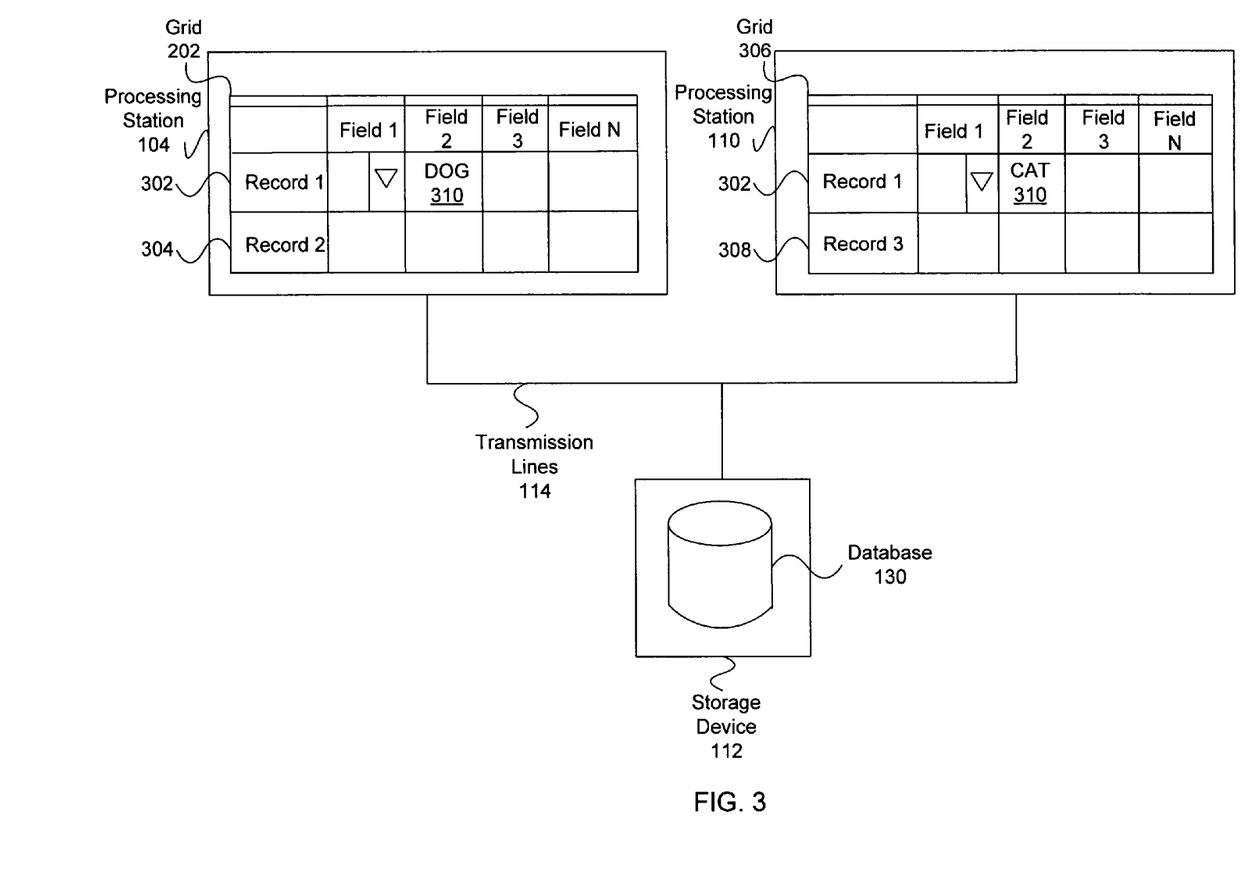
FIG. 3 shows example display representations for multiple users according to according to one or more embodiments of the invention.

FIG. 3 shows example display representations for multiple users according to according to one or more embodiments of the invention. By way of example, within processing station 104 is grid 202 displaying a first record 302 and a second record 304. Within processing station 110 is grid 306 displaying a first record 302 and a second record 308. Thus, in this example, two different processing stations (i.e., processing station 104 and processing station 110) have the same record 302 presented for editing.

A user of processing station 110 may attempt to modify a field 310 of record 302 (e.g., enter the value "DOG" into field 310) while processing station 104 has also attempted to modify the same field 310 of record 302 (e.g., enter the value "CAT" into field 310). As we have previously discussed, modification of a field of a record by one or more users when two or more users have the record open for editing requires that a conflict resolution process to take place prior to saving one of those modifications, to determine which of the modifications should be chosen (e.g., choosing "DOG" or "CAT" for field 310 of record 302).

Figure 4:
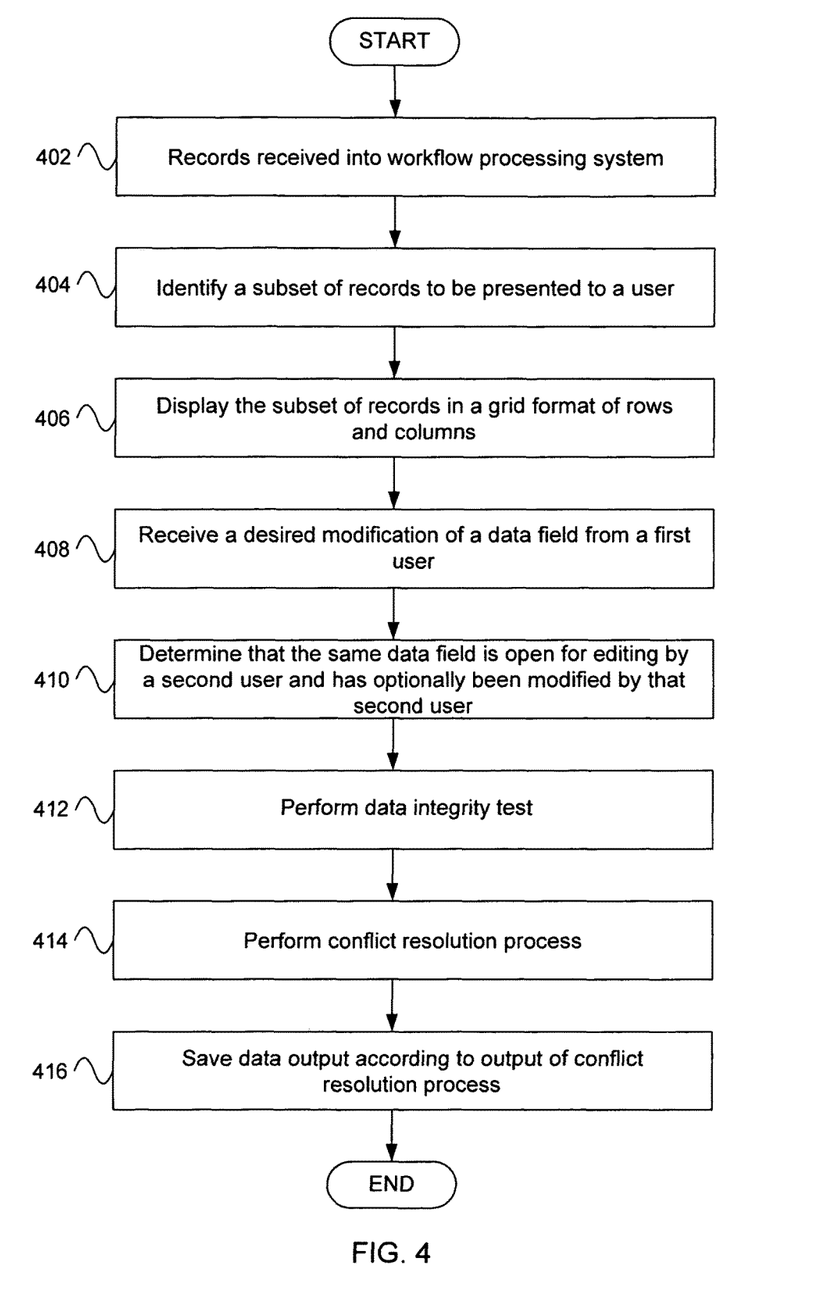
FIG. 4 shows a flow chart according to one or more embodiments of the invention.

FIG. 4 shows a flow chart according to one or more embodiments of the invention. At 402 records are received into workflow processing system 102 (of FIG. 1). The records may be received from one location or may instead be received from multiple locations. In one or more embodiments of the invention, workflow system 102 involves customer support inquiries received from multiple sources.

In one or more embodiments of the invention, those multiple sources optionally include the internet, a telephone call center having one or more incoming customer service telephone lines, etc.

At 404, a subset of the records received at 402 are identified and set up for presentation to a first user. A subset of records includes any number of records from one record up to the total number of records present in database 130 (of FIG. 1), which includes all records ever received into the workflow system 102 (of FIG. 1) at any time since inception, minus any records that have since been deleted.

At this time or at anytime before or after, an overlapping subset of records is presented to a second user. For a first subset of records to overlap a second subset means that at least one record is common between the two subsets of records.

At 406, the first subset of records is displayed to the first user in a grid format such as that previously discussed. It is not necessary that the second subset of records be presented to the second user in a grid format. Rather, the second subset of records may be presented to the second user in any way desired by the system designers or those skilled in the art.

At 408, a first desired modification of a data field is received from the first user. At 410, a determination is made that the same data field in the same record has been modified subsequent to opening the data field for editing by the first user, by a second user of the workflow system.

At 412, a data integrity test is performed on one or more of the proposed modifications, to ensure that any modification that is saved conforms to any data integrity requirements that may exist for the particular field. If the data integrity test fails, the user associated with the failed modification is optionally notified and given an opportunity to correct the errant modification. Data integrity requirements are system dependant, and may include such requirements as requiring text only entries, requiring numeric only entries, date format entries, the field being read only, the field being append only, etc.

At 414, a conflict resolution is engaged and performed to determine whether to incorporate the first or the second desired modification, based on which modification is chosen.

Specifically, in one or more embodiments of the invention, conflicts between two users are resolved by: (1) informing the users that a conflict exists (e.g., a first user is attempting to change a priority attribute of the data from P3 to P1 and a second user is attempting to change a priority attribute of the data from P3 to P2); (2) highlighting the particular data cell in question; and (3) asking the second user to choose which of the conflicting changes (i.e., the attempted change by the first user and the attempted change by the second user) to accept. One skilled in the art will appreciate that if more than one conflict exists, the process repeats for each cell with a conflict (with the user choosing which of the conflicting changes to accept over and over again). Further, one skilled in the art will appreciate that if a third user creates additional conflicts while the second user is performing conflict resolution, the second user is presented with a new set of conflicts (the conflict between the accepted change and the change attempted by the third user) when attempting to save the earlier accepted changes.

Alternatively, in one or more embodiments of the invention, the conflict resolution procedure may involve determining which user or which modification has a higher priority. Such a determination may be made in many ways. In one or more embodiments of the present invention, priority is determined by considering characteristics associated with the users making the modifications. In one or more embodiments of the invention, one user is designated as a higher priority user in an organizational hierarchy with respect to another user. Optionally, this designation is field-specific. Persons of ordinary skill in the art having the benefit of this disclosure will readily be aware of other ways of determining the priority of one user or modification with respect to particular fields as compared with another user or modification, in accordance with the invention. Regardless, a modification is eventually chosen.

At 416, if the conflict resolution process is properly performed, the chosen modification is saved, assuming that modification has also passed the data integrity test. Generally speaking, in accordance with one or more embodiments of the invention, the chosen modification is the data output of the conflict resolution process.

An application or process that is configured to perform the workflow processing operations being discussed may be resident on a single computer within a network of computers, may be an application or process executing on a network of computers, or may be an application or process being executed on a node within a grid, etc.

Computer code implementing the methods presented in this disclosure may be stored in memory within a computer, or alternatively stored in more permanent computer readable media such as one or more hard drives, optical disks, compact disc (CD), magnetic tapes, or similar storage medium. Further, such code may be transferred over communications networks with or without a carrier wave.

Further, software instructions to perform embodiments of the invention may be stored on a computer readable medium such as a flash memory, CD, hard disk drive, diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing data comprising:
    identifying a first database record comprising a first field and a second field, and a second database record comprising the first field;
    displaying a first grid including a first column, a second column, a first row having the first database record, and a second row having the second database record,
    wherein the first field of the first database record is displayed in a first cell of the first grid,
    wherein the first field of the second database record is displayed in a second cell of the first grid,
    wherein the first cell and the second cell are located in the first column of the first grid, and
    wherein the second field of the first database record is located in the second column;
    displaying a second grid including the first database record, the first field of the first database record, the second field of the first database record, a third database record, and the second field of the third database record;
    receiving, from a first user at a first location, a first modification value for the first field while displaying the first grid and the second grid;
    setting, in the first cell and the second cell of the first grid, the first field of the first database record and the first field of the second database record to the first modification value;
    highlighting, in response to receiving the first modification value, the first field of the first database record in the second grid, wherein the second grid is viewable by a second user at a second location; and
    storing the first modification value in the first field of the first database record and the second database record after highlighting the first field.

2. A workflow process system comprising:
    a processor;
    a memory operatively connected to the processor; and
    a plurality of instruction stored in the memory and comprising functionality to:
        identify a first database record comprising a first field and a second field, and a second database record comprising the first field;
        display, on a first display device, a first grid including a first column, a second column, a first row having the first database record, and a second row having the second database record,
        wherein the first field of the first database record is displayed in a first cell of the first grid,
        wherein the first field of the second database record is displayed in a second cell of the first grid,
        wherein the first cell and the second cell are located in the first column of the first grid, and
        wherein the second field of the first database record is located in the second column;
        display a second grid including the first database record, the first field of the first database record, the second field of the first database record, a third database record, and the second field of the third database record on a second display device;
        receive, from a first user at a first location, a first modification value for the first field while displaying the first grid and the second grid;
        set, in the first cell and the second cell of the first grid, the first field of the first database record in the first cell to the first modification value and the first field of the second database record in the second cell to the first modification value;
        highlight, in response to receiving the first modification value, the first field of the first database record in the second grid wherein the second grid is viewable by a second user at a second location; and
        store the first modification value in the first field of the first database record and the second database record after highlighting the first field of the first database record in the second grid.

3. A non-transitory machine readable medium storing executable instructions for managing data, the instructions comprising functionality to:
    identify a first database record comprising a first field and a second field, and a second database record comprising the first field;
    display, on a first display device, a first grid including a first column, a second column, a first row having the first database record, and a second row having the second database record,
    wherein the first field of the first database record is displayed in a first cell of the first grid,
    wherein the first field of the second database record is displayed in a second cell of the first grid, wherein the first cell and the second cell are located in the first column of the first grid, and wherein the second field of the first database record is located in the second column;

display a second grid including the first database record, the first field of the first database record, the second field of the first database record, a third database record, and the second field of the third database record on a second display device;

receive, from a first user at a first location, a first modification value for the first field while displaying the first grid and the second grid;

set, in the first cell and the second cell of the first grid, the first field of the first database record and the first field of the second database record to the first modification value;

highlight, in response to receiving the first modification value, the first field of the first database record in the second grid wherein the second grid is accessible by a second user at a second location; and store the first modification value in the first field of the first database record and the second database record after highlighting the first field of the first database record in the second grid.

4. The method of claim 1, further comprising:
receiving, from a second user at the second location, a first modification value for the second field before storing the first modification value for the first field;
setting, in the second grid, the second field of the first database record and the third database record to the first modification value for the second field; and
storing the first modification value for the second field in the second field of the first database record and the third database record after storing the first modification value for the first field.

5. The method of claim 1, further comprising:
receiving, from a second user at the second location, a second modification value for the first field after receiving the first modification value; and
triggering a conflict resolution process for selecting a chosen modification value from a group consisting of the first modification value and the second modification value.

6. The method of claim 5, further comprising:
storing the second modification value in the first field of the first database record and the second database record,
wherein the chosen modification value is the second modification value, and
wherein the second modification value is received after storing the first modification value.

7. The method of claim 5, wherein the chosen modification value is the first modification value and wherein the second modification value is received before storing the first modification value.

8. The method of claim 5, wherein selecting the chosen modification value is based on a comparison between a status of the first user in an organizational hierarchy and a status of the second user in the organizational hierarchy.

9. The method of claim 1, wherein the first database record is a row in the first grid.

10. The method of claim 1, wherein the first field of the first database record in the first grid is associated with a calendar interface.

11. The method of claim 1, wherein identifying the first database record and the second database record is part of a workflow process based on predefined criteria.

12. The method of claim 11, wherein the predefined criteria comprises at least one selected from a group consisting of a predefined time interval, a number of database records awaiting processing by the first user, and a priority assigned to the first database record.

13. The workflow process system of claim 2, the instructions further comprising functionality to:
receive, from a second user at the second location, a first modification value for the second field before storing the first modification value for the first field;
set, in the second grid, the second field of the first database record and the third database record to the first modification value for the second field; and
store the first modification value for the second field in the second field of the first database record and the third database record after storing the first modification value for the first field.

14. The workflow process system of claim 2, the instructions further comprising functionality to:
receive, from a second user at the second location, a second modification value for the first field after receiving the first modification value; and
trigger a conflict resolution process for selecting a chosen modification value from a group consisting of the first modification value and the second modification value.

15. The workflow process system of claim 14, the instructions further comprising functionality to:
store the second modification value in the first field of the first database record and the second database record,
wherein the chosen modification value is the second modification value, and
wherein the second modification value is received after storing the first modification value.

16. The workflow process system of claim 14, wherein the chosen modification value is the first modification value and wherein the second modification value is received before storing the first modification value.

17. The workflow process system of claim 14, wherein selecting the chosen modification value is based on a comparison between a status of the first user in an organizational hierarchy and a status of the second user in the organizational hierarchy.

18. The workflow process system of claim 2, wherein identifying the first database record and the second database record is part of a workflow process based on predefined criteria.

19. The workflow process system of claim 18, wherein the predefined criteria comprises at least one selected from a group consisting of a predefined time interval, a number of database records awaiting processing by the first user, and a priority assigned to the first database record.

20. The non-transitory machine readable medium of claim 3, the instructions further comprising functionality to:
receive, from a second user at the second location, a first modification value for the second field before storing the first modification value for the first field;
set, in the second grid, the second field of the first database record and the third database record to the first modification value for the second field; and
store the first modification value for the second field in the second field of the first database record and the third database record after storing the first modification value for the first field.

21. The non-transitory machine readable medium of claim 3, the instructions further comprising functionality to:

receive, from a second user at the second location, a second modification value for the first field after receiving the first modification value; and trigger a conflict resolution process for selecting a chosen modification value from a group consisting of the first modification value and the second modification value.

22. The non-transitory machine readable medium of claim 21, the instructions further comprising functionality to:

store the second modification value in the first field of the first database record and the second database record, wherein the chosen modification value is the second modification value, and wherein the second modification value is received after storing the first modification value.

23. The non-transitory machine readable medium of claim 21, wherein the chosen modification value is the first modification value and wherein the second modification value is received before storing the first modification value.

24. The non-transitory machine readable medium of claim 21, wherein selecting the chosen modification value is based on a comparison between a status of the first user in an organizational hierarchy and a status of the second user in the organizational hierarchy.

25. The non-transitory machine readable medium of claim 3, wherein identifying the first database record and the second database record is part of a workflow process based on predefined criteria.

26. The non-transitory machine readable medium of claim 25, wherein the predefined criteria comprises at least one selected from a group consisting of a predefined time interval, a number of database records awaiting processing by the first user, and a priority assigned to the first database record.

* * * * *